United States Patent
Ledgard et al.

[11] Patent Number: 6,023,556
[45] Date of Patent: Feb. 8, 2000

[54] PROCESSING PRINT JOB IMAGE DATA

[75] Inventors: Gordon R. Ledgard, West Newton; Subramaniam V. Alylam, Norwood, both of Mass.

[73] Assignee: GammagrapnX, Inc., Waltham, Mass.

[21] Appl. No.: 08/790,505

[22] Filed: Jan. 29, 1997

[51] Int. Cl.[7] .............. B41B 15/00; H04N 1/21
[52] U.S. Cl. ........... 395/102; 395/102; 395/114; 395/115; 395/116; 358/296
[58] Field of Search .................. 395/114, 115, 395/102, 110, 111, 116; 358/296

[56] References Cited

U.S. PATENT DOCUMENTS

| | | | |
|---|---|---|---|
| 4,656,605 | 4/1987 | Clayton | 365/52 |
| 4,727,513 | 2/1988 | Clayton | 365/52 |
| 5,150,454 | 9/1992 | Wood et al. | 395/114 |
| 5,151,949 | 9/1992 | Miyata | 382/9 |
| 5,377,312 | 12/1994 | Kobayashi | 395/116 |
| 5,504,842 | 4/1996 | Gentile | 395/114 |
| 5,506,944 | 4/1996 | Gentile | 395/114 |

FOREIGN PATENT DOCUMENTS 0 475 601 A2   8/1991   European Pat. Off. .

*Primary Examiner*—Edward L. Coles
*Assistant Examiner*—Twyler Lamb
*Attorney, Agent, or Firm*—Fish & Richardson P.C.

[57] ABSTRACT

A method of processing image data to be sent as a print job to be printed on a printer including, defining at least one composite frame for a side of a sheet to be printed and one or more individual frames to appear in each composite frame, each individual frame being defined in terms of individual frame parameters that specify image data to be used in the individual frame and the display of said individual frame in said composite frame, generating control signals to control interface circuitry in response to the individual frame parameters, receiving the control signals and the image data for each individual frame at the interface circuitry, assembling a bit map for the side at the interface circuitry based upon the image data as specified by the control signals for all individual frames on the side, and outputting the bit map from the interface circuitry to the printer.

22 Claims, 4 Drawing Sheets

PROCESSING PRINT JOB IMAGE DATA

BACKGROUND OF THE INVENTION

The invention relates to processing image data to be sent as a print job to be printed on a printer.

A computer data file describing an image to be printed on a printer is typically first converted at a software interpreter (e.g., an Adobe or Harlequin PostScript interpreter) into a bit map. The image is broken down into horizontal lines and individual pixels within each line, and the bit map defines one or more bits per pixel to control the printer to deposit toner or ink or other source of image at the pixel location. Graphic images to be printed are also similarly defined by bit maps.

It is known to compress the bit map data at a CCITT Group IV compressor and store it in a tagged image file format (TIFF) file for storage on a hard disk or other mass storage device. The TIFF files can then be accessed and decompressed as they are needed just prior to sending the decompressed bit maps to the printer.

It is known to combine fixed print data (e.g., a form) with variable print data in application software to create print files that are then output as PostScript files containing the variable data and the fixed data.

It is also known to combine files of graphic images with text files in application software to create bit maps for images containing both the text and graphic image.

SUMMARY OF THE INVENTION

In one aspect, the invention features, in general, a method of processing image data to be sent as a print job to be printed on a printer. The method includes defining at least one composite frame for a side of a sheet to be printed and one or more individual frames to appear in each composite frame. Each individual frame is defined in terms of individual frame parameters that specify image data to be used in the individual frame and the display of the individual frame in the composite frame. Control signals to control interface circuitry are generated in response to the individual frame parameters, and the control signals and the image data for each individual frame are provided to the interface circuitry. The interface circuitry assembles a bit map for the side of the sheet based upon the image data and as specified by the control signals and outputs the bit map to the printer.

Certain implementations of the invention may include one or more of the following features. In certain implementations, there are a plurality of bit maps for each side, each bit map corresponding to a color or multi-tonal monochrome element of an image to be printed. The bit map has one or more bits per pixel. Bit maps are sequentially created for additional sides to be printed, and the interface circuitry assembles bit maps sufficiently fast to provide a backlog of the bit maps to maintain outputting of bit maps at the printer speed.

In assembling bit maps, image data of individual frames are written to addresses of randomly accessible buffers corresponding to locations at which the individual frames will appear on the printed side. Image data stored in a randomly accessible buffer are read and modified at a processor to obtain modified image data, and the modified image data are written to the same or a different randomly accessible buffer. Image data of overlapping individual frames in a composite frame are combined at an imposition processor, and the resulting combined values are written to a randomly accessible buffer. The bit maps are temporarily stored in the randomly accessible buffers used for assembling the bit maps.

The individual frame parameters include the size of a an individual frame and the location of the individual frame with respect to a respective composite frame. The individual frame parameters can include a scale parameter and an orientation parameter specifying orientation of an individual frame with respect to a composite frame, and the assembling includes scaling and rotating image data as specified by a control signal generated in response to the scaling orientation parameters. The individual frame parameters can also include a data type parameter specifying one of a plurality of different types of image data. A composite frame can include individual frames having different data type parameters. The data types can include bit map, compressed bit map, ASCII string and numeric. Image data in the form of a compressed bit map are decompressed at a decompressor on the interface circuitry as specified by a control signal generated in response to a data type parameter. The image data can be in a form other than a bit map or compressed bit map, and can be converted to a bit map or a compressed bit map prior to sending to the interface circuitry. The individual frame parameters can include an image combination characteristic specifying how to combine image data values for the same pixel location in a composite frame. A sheet in a print job can be specified in terms of sheet parameters including sheet size and sheet orientation.

Embodiments of the invention may include one or more of the following advantages. Different types of image data and image data from different sources can be efficiently combined in hardware (instead of host memory) and directly output as an assembled bit map in real time to a printer. The printing method is independent of software applications and other sources used to generate the image data and is independent of the type of printer engine used to print the assembled bit maps.

Other advantages and features of the invention will be apparent from the following description of an embodiment thereof and from the claims.

DESCRIPTION OF THE PREFERRED EMBODIMENT

Figure 1:
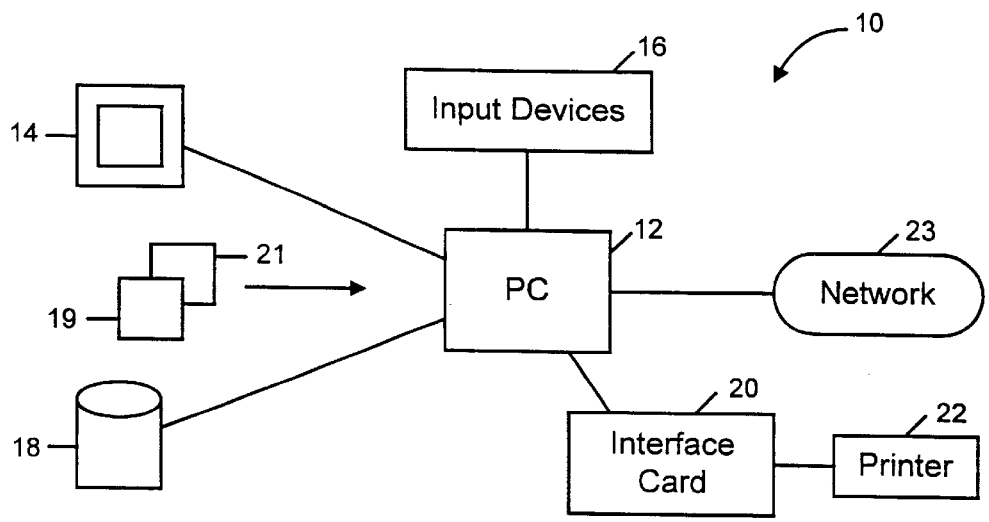
FIG. 1 is a diagram showing a computer based system for printing images.

Referring to FIG. 1, there is shown system 10 for printing computer based images. System 10 includes personal computer 12 and associated monitor 14, input devices 16 (keyboard, mouse, scanner, etc.), and hard disk 18 or other media for mass storage. Personal computer 12 includes printer controller software 19, print job manager software 21, other user application software (not shown), and interface card 20 used to assemble bit maps for printing at printer 22. Alternatively, print job manager software 21 can reside on a separate computer from the computer on which the printer controller software is implemented. Personal computer 12 has a Peripheral Component Interconnect (PCI) bus used for operations with peripherals such as interface card 20. Computer 12 is connected to network 23 and can receive data files (including images to be printed) from other devices connected to network 23 and can also receive job specification 24 from a remote source. Printer 22 can be any printer based on the so-called Xerographic process, e.g., a laser printer engine available from Ricoh under the LP-M 38 designation, from Kodak under the IS92 designation, or from Hitachi under the Typhoon T-30, T-40, and T-60 designations.

Figure 2:
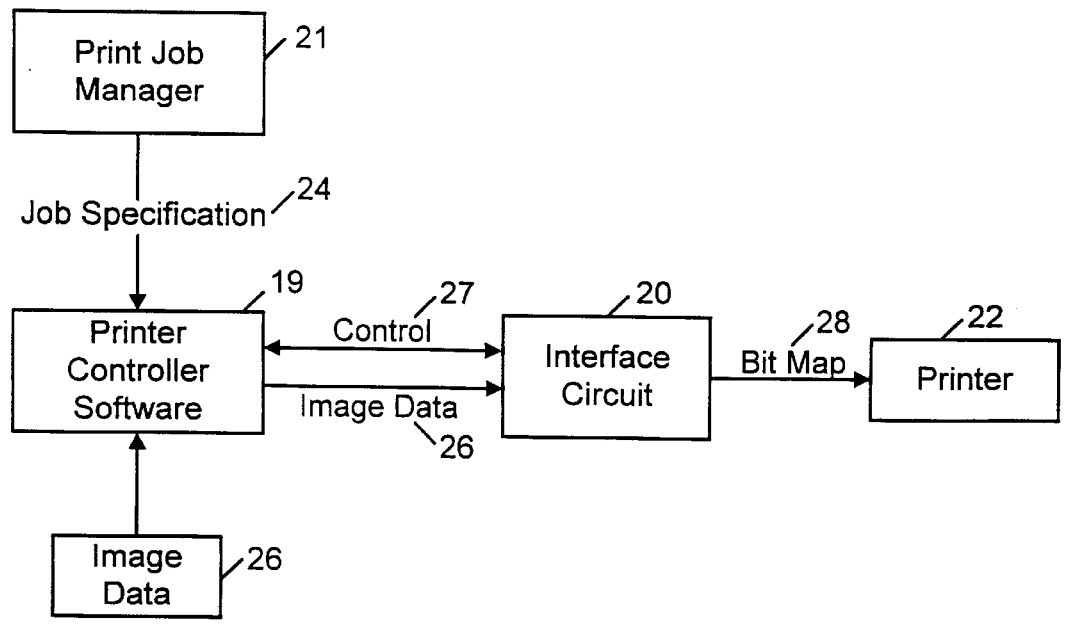
FIG. 2 is a diagram showing the processing of a print job on the FIG. 1 system.

Referring to FIG. 2, there is shown the process used to carry out print jobs on system 10. Job manager software 21 interacts with a user to create job specification 24. Printer controller software 19 accesses job specification 24 and image data 26 and creates a job tree (shown in FIG. 4 and discussed in detail below) and provides control signals 27 and image data 26 to interface circuit 20. The job tree defines at least one composite frame for a side of a sheet to be printed and one or more individual frames to appear in each composite frame in terms of individual frame parameters that specify image data to be used in the individual frame and the display of the individual frame in the composite frame. Interface circuit 20 is controlled by software 19 to use the image data to assemble bit maps 28 used to print the images of the print job at printer 22.

Image data 26 used in the print job can be obtained from a variety of sources such as computer applications, local peripheral devices, and remote devices on network 23. The image data can be PostScript or other files, raw bit maps, or compressed data (e.g., CCITT Group IV bit maps). The files that are not in the form of raw bit maps or compressed bit maps must be converted to one of these forms, e.g., by an interpreter, before sending to interface circuit 20. Such an interpreter can, for example, be an Adobe or Harlequin PostScript interpreter.

Figure 3:
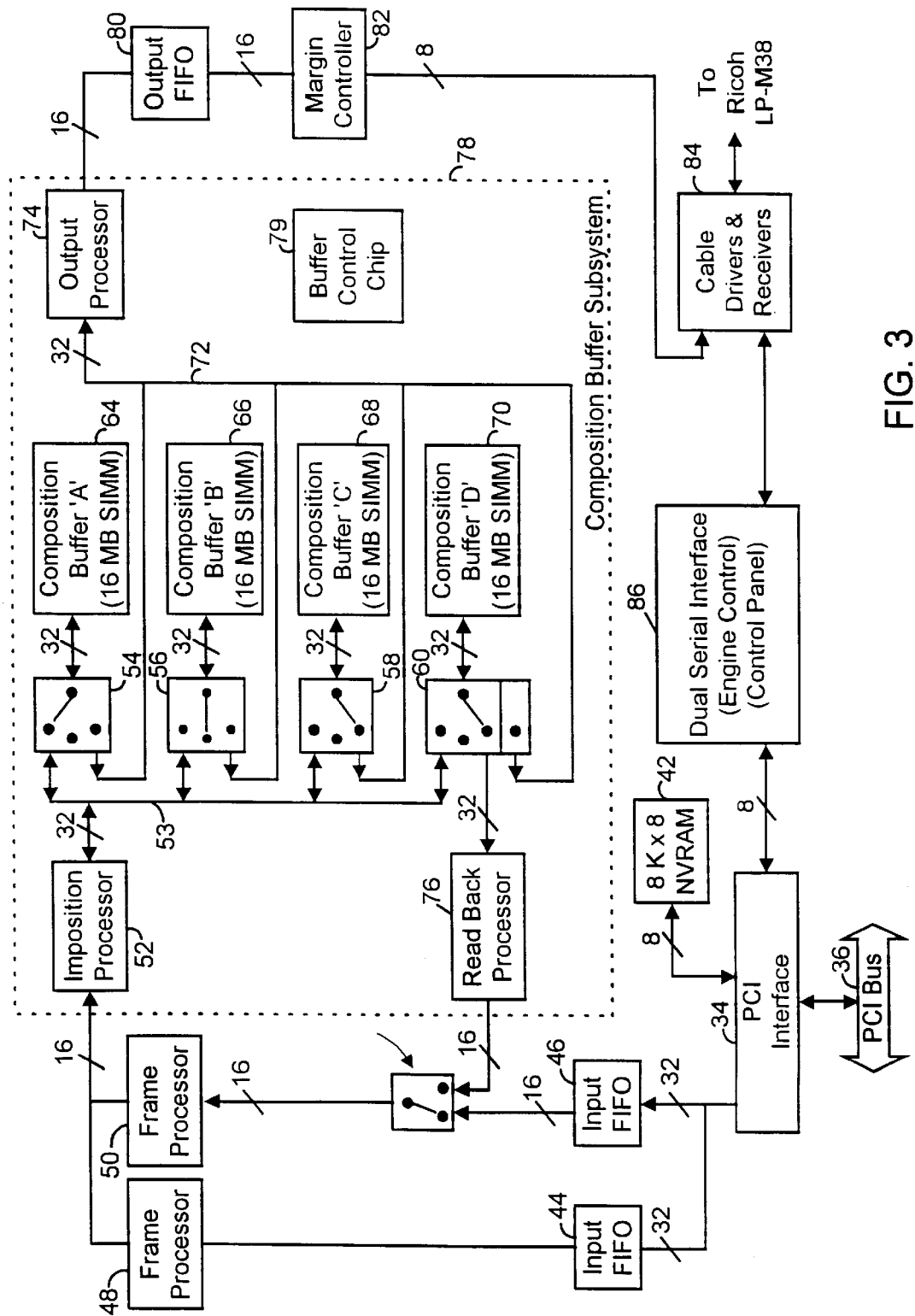
FIG. 3 is a block diagram of an interface card used in the FIG. 1 system.

Referring to FIG. 3, interface card 20 includes PC interface chip 34 (PCI9060SD available from PLX Technology) which is connected to PCI bus 36 of personal computer 12 and includes a local bus (not shown). PCI interface chip 34 communicates with other devices on interface card 20. Non-volatile random access memory (NVRAM) 42 is an 8K-byte battery backed-up static RAM that provides non-volatile storage for print recovery information. Input FIFOs 44, 46 receive image data sent by direct memory access (DMA) hardware in PCI interface chip 34 from the host memory of PC 12. Frame processor 48 is connected to receive data from input FIFO 44, and frame processor 50 is connected to receive data from input FIFO 46. Frame processors 48, 50 are integrated circuits available under the Pixel Magic PM2m Jaguar trade designation; these components can decompress compressed image files and perform image clipping and padding, frame rotation, and scaling, and are controlled by the control signals generated by printer control software 19. Frame processors 48, 50 each output image data in 16-bit words to imposition processor 52 of composition buffer subsystem 78. In order to meet data throughput requirements, software 19 can control interface card 20 to alternate between frame processors 48 and 50.

The image data are output from imposition processor 52 in 32-bit words, which are provided to selector switches 54, 56, 58, 60. As indicated in FIG. 3, selector switches 54–58 have three modes of operation with respect to the respective 16 MB composition buffers 64, 66, 68 (dynamic random access memory of single in-line memory modules). Normally each composition buffer 64–70 holds the image for one side of paper; images with multiple frames are assembled by writing the frames of data to the appropriate locations in the buffer and modifying the data (either before or after it is initially written to the buffer) as indicated by control signals generated from the job tree specification. In the top position shown in FIG. 3 for the selector switches, the buffers are connected to write data to or read data from imposition processor 52 over bus 53. In the lower position shown, the composition buffers are connected to write data over output bus 72 to output processor 74. In the middle position shown, the buffers are not connected to input bus 53 or output bus 72. Selector switch 60 for composition buffer 70 has the three positions just mentioned and in addition has a fourth position in which composition buffer 70 is connected to write data to read back processor 76.

The components of composition buffer subsystem 78 (processors 52, 74, 76, selector switches 54–62 and composition buffers 64–70) are all controlled by buffer control chip 79, connected to receive instructions from host PC 12 over PCI interface 34. The following registers (which are all 16 bits) are addressed into the memory address space of PCI bus 36 and are used by printer controller software 19 to control the operation of the indicated components to assemble bit maps as specified in the job tree from image data 26 input to input FIFOs 44, 46.

Imposition Processor 52 Registers
Imposition Buffer Select Register
Frame Imposition Register
Frame Y Length Register
Frame Start Y Register
Frame X Length Register
Frame Start X Register
Composition Buffers 64–70 Registers
A Buffer Length Register
A Buffer Width Register
B Buffer Length Register
B Buffer Width Register
C Buffer Length Register
C Buffer Width Register
D Buffer Length Register
D Buffer Width Register
Martin Controller 82 Registers
Vertical Image Register
Vertical Offset Register
Horizontal Image Register
Horizontal Offset Register
Print Buffer Select Register
Read Back Processor 76 Register
Read Back Select Register
Frame Processor Registers
PM2 Register data
PM2 Index Register Referring to FIG. 3, the order of image words coming from frame processor 48 or 50 depends upon the operations that were done on the individual frame. Imposition processor 52 calculates the appropriate address to place each of the image words into one of the composition buffers 64–70. Registers within imposition processor 52 specify where the image is to be placed in the composition buffer and by which method. The different methods relate to how the new pixel data (referred to as the source) are combined with the existing pixel data (referred to as destination) at a given address. The operations include OR to black, OR to white, and opaque. OR to black imposition means that the buffer pixel will be black if either the new pixel or the existing pixel was black. OR to white will make the buffer pixel white if either the new or the old pixel value is white.

Opaque imposition means that the new frame pixels replace any existing image pixels in the buffer.

Read back processor 76 is used to feed an image stored in composition buffer 70 back into frame processor 50 for a further operation. E.g., frame processor 50 cannot do a simultaneous scale and rotation for a frame of image data. Thus, if both operations are necessary for a frame of image data, one operation can be carried out on a first pass through frame processor 50, and the processed image data can be stored in buffer 70; thereafter the second operation can be carried out on a second pass of the frame provided by read back processor 76. The processed image data can be read back to the same or a different composition buffer 64–70.

Output processor 74 is used to extract an assembled bit map for a side of a sheet and to send it to output FIFO 80 and margin controller 82. Output FIFO 80 allows circuitry connected to its input to run synchronously with the clock running frame processor 48 or 50 and composition buffer subsystem 78 while allowing the output to run synchronously with margin controller 82, which runs from the clock supplied by or to the printer interface.

Margin controller 82 includes logic with registers that specify the position and size of the side on the sheet. The horizontal offset specifies the beginning of the image area for each side, and the vertical offset specifies the first line of the side measured from the top of the page in units of lines. At the start of a page, white lines specified by the vertical offset are sent to the printer before sending the first image line. At the start of each line, a number of white pixels specified by the horizontal offset are sent to printer 22 before sending the image data from the output FIFO 80. Composition buffers 64–70 and output FIFO 80 are only used to hold image data and are not accessed for white areas. Two more registers specify the right and bottom edge of the image to be printed.

Cable driver 84 includes driver and receiver logic necessary to interface the cable going to print engine 22. Dual serial interface 86 (e.g., available from Startech under the ST16C2550CJ designation) is used to permit communication between printer engine 22 and host software. Depending on the specific print engine used, the pixel data stream can be reformatted downstream of margin controller 82.

Figure 4:
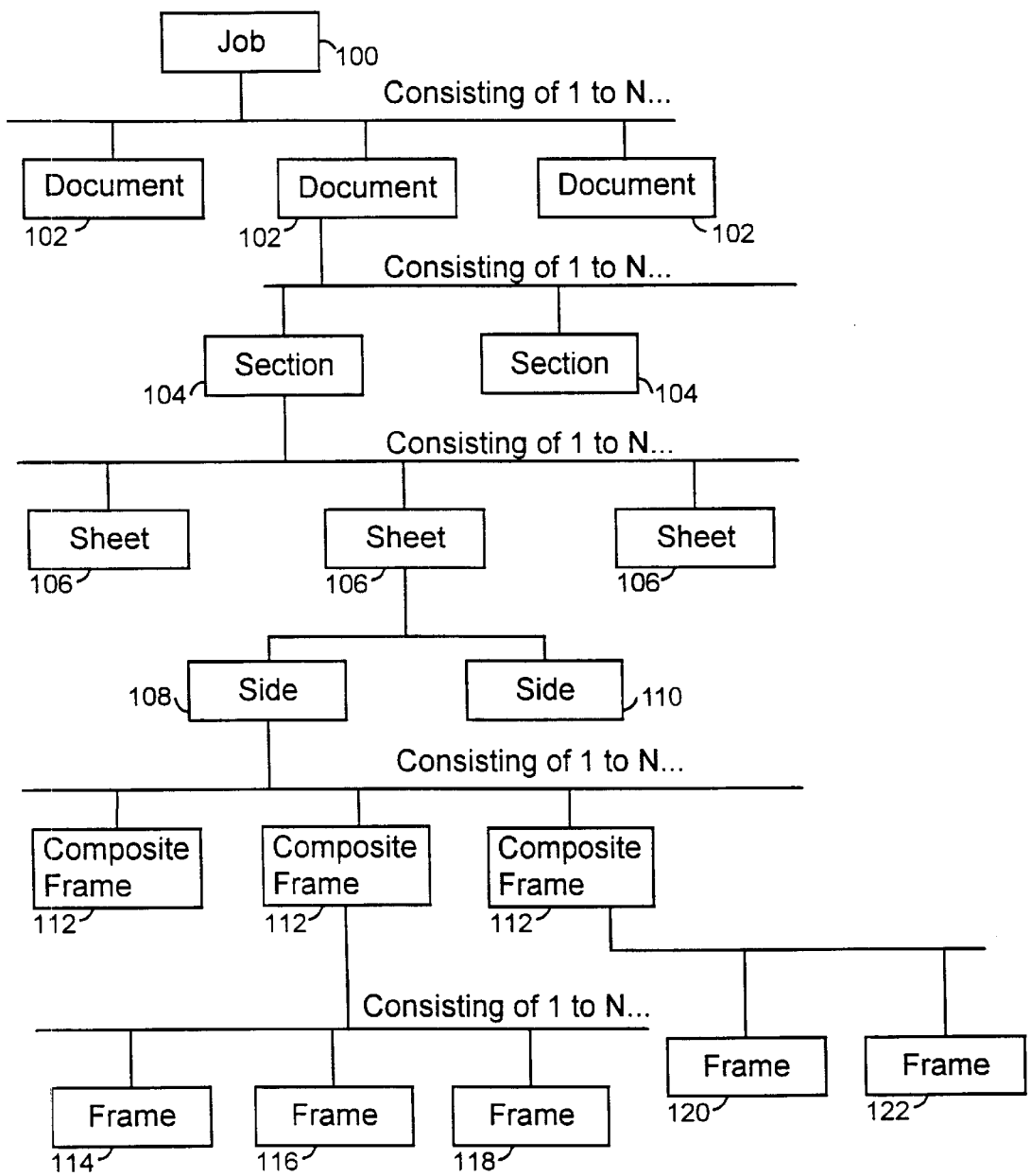
FIG. 4 is diagram of a print job specification used in the FIG. 1 system.

Referring to FIG. 4, there is shown job tree created from job specification 24 for print job 100. It is seen that each print job includes one or more documents 102, which, for example, could be separate booklets or separate chapters in a notebook. Each document includes one or more sections 104, which, for example, could be a chapter or part of a chapter. Each section 104 is made up of one or more sheets of paper 106, which each have a front side 108 and may have a back side 110. Each side of a sheet 108 or 110 has one or more composite frames 112, and each composite frame 112 is made up of one or more individual frames 114, 116, 118, 120, 122. Each individual frame can have one or more colors, each with one or more bits per pixel.

Figure 5:
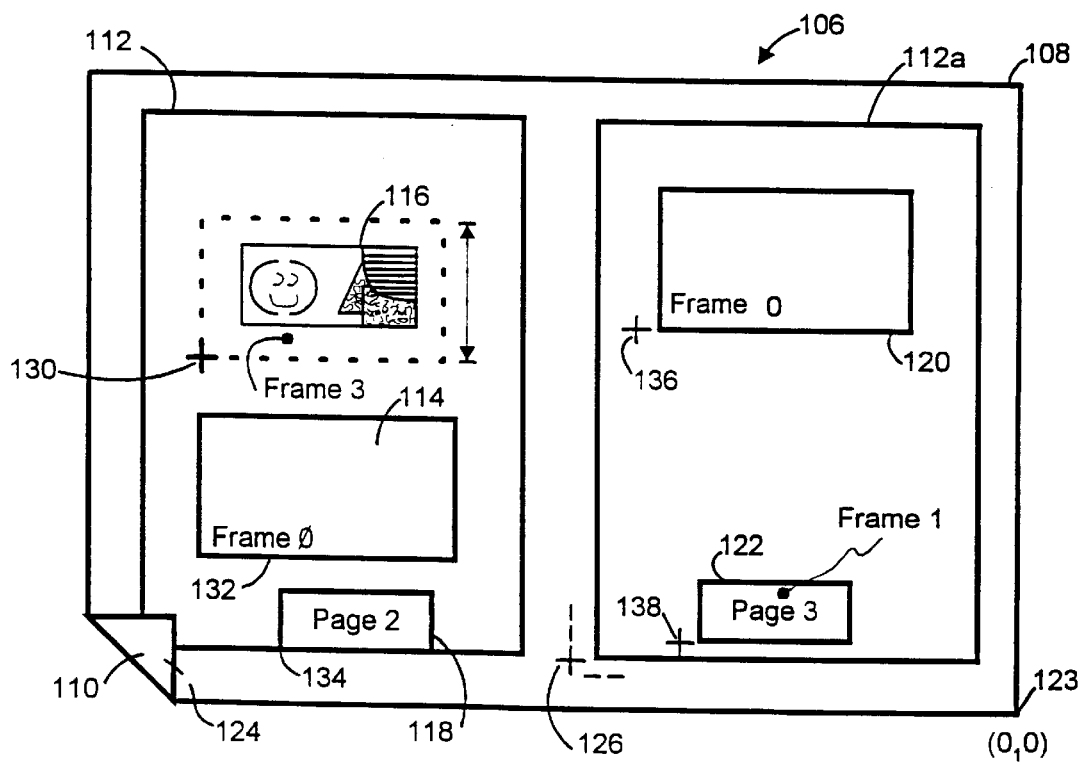
FIG. 5 is a diagram illustrating composite frames and individual frames on a side of a sheet printed by the FIG. 1 system.

Referring to FIG. 5, an illustrative example of a side 108 of a sheet 106 is shown in detail. Side 108 includes two composite frames 112, 112a, which are the facing inside pages numbered 2 and 3 of a four-page brochure printed on both sides of sheet 106. Composite frame 112 includes three individual frames: individual frame 114 is text; individual frame 116 is a graphic illustration, and individual frame 118 at the bottom has the text "Page 2." Composite frame 112a includes individual frame 120 of text and an individual frame 122 that has the text "Page 3".

Sides 108, 110, composite frames 112, 112a, and individual frames 114–122 are all rectangles, which are defined by an orientation and by X,Y coordinates used to specify size and location for these items. Side 108 has sheet origin 123, and composite frames 112, 112a have origins 124 (hidden in FIG. 5) and 126 respectively. The composite frames are located with respect to side 108 by the X, Y positions of their origins 124, 126 with respect to sheet origin 122. The individual frames 114–122 similarly have origins 130 that locate the individual frames with respect to the origins 124, 126 of the composite frames 112, 112a. Other points of reference could be used.

Referring to FIGS. 2–4, upon receiving a job specification 24, printer control software 19 generates the job tree of FIG. 4 and traverses the job tree to determine the order in which the data images for individual frames 114–122 should be transmitted to interface circuit 20 and the operations that need to be performed by the components on interface circuit 20 in order to assemble bit maps 28 that are transmitted to printer 22 at the times required by printer 22. Printer control software 19 then accesses the frames of image data and generates control signals 27 to control the components on interface circuit 20 by the values written to registers for the various components. Printer controller software 19 determines if any individual frame exceeds, in any dimension, the rectangular region defined by its containing composite frame, and computes, for any such frame, clipping dimensions. Any such clipping dimensions are transmitted to the frame processor 48 or 50, which then automatically clips the frame image on its way to the appropriate composition buffer. The resultant images are thus guaranteed not to exceed the composite frame bounds. Printer controller software 19 also determines, for every color in every individual frame in every composite frame on a side, a bounding rectangle which contains all of the bits of that color on the side. These dimensions are passed to margin controller 82, whose function is to correctly position this bounding rectangle on the paper and fill the area outside this rectangle with a blank margin.

Table 1 below presents the individual frame parameters, composite frame parameters, and sheet parameters used to specify a print job 100 in a job tree in the left hand column. The right hand column identifies how the specified parameter is utilized in assembling a bit map for a side.

TABLE 1

| Job Tree Parameter Specified | How/Where Parameter Utilized |
| --- | --- |
| INDIVIDUAL FRAME | |
| Size (X, Y) | Frame processor, imposition processor |
| Location (X, Y) | Imposition processor |
| Clipping and scaling | Frame processor |
| Orientation | Frame processor |
| data type (compressed or not; compression type) | Frame processor |
| Image combination characteristic | Imposition processor |
| Image data identifier (source or location) | printer controller software |
| list of colors | printer controller software |
| bits per pixel | printer controller software and frame processor |
| COMPOSITE FRAME | |
| Size (X, Y) | Frame Processor |
| Location (X, Y) | Imposition Processor |

TABLE 1-continued

| Job Tree Parameter Specified | How/Where Parameter Utilized |
|---|---|
| Orientation | Frame processor |
| SHEET | |
| Size | Margin controller, Frame Processor |
| Orientation | Frame Processor |

Other embodiments of the invention are within the scope of the appended claims.

What is claimed is:

1. A method of processing image data to be sent as a print job to be printed on a printer comprising, creating a lob specification by defining a lob as being constituted of one or more documents, defining each said document as being constituted of one or more sheets of paper, each sheet being of a specific size, defining each said sheet of paper as being constituted of one or two sides of paper, defining at least one composite frame for each said side of a sheet to be printed, each said composite frame being defined by composite frame parameters that specify the display of said composite frame on said side of a sheet, defining one or more individual frames to appear in each said composite frame, each said individual frame being defined in terms of individual frame parameters that specify image data to be used in the individual frame and the display of said individual frame in said composite frame, each said composite frame being referenced in position with respect to said side to be printed in said composite frame parameters, each said individual frame being referenced in position with respect to its respective composite frame in said individual frame parameters, inputing said job specification and said image data specified in said individual frames of said lob specification to a printer controller run by printer controller software, positioning said composite frames of each said side as determined by said composite frame parameters and size of said sheet of paper and positioning each said individual frame within the respective said composite frame as determined by said individual frame parameters by said printer controller, generating control signals by said printer controller to control interface circuitry in response to said individual frame parameters and said composite frame parameters, receiving said control signals and said image data for each said individual frame at said interface circuitry, assembling a bit map for said side at said interface circuitry based upon said image data as specified by said control signals for all individual frames on said side, and outputting said bit map from said interface circuitry to said printer.

2. The method of claim 1 wherein there are a plurality of bit maps for each said side, each bit map corresponding to a color or multi-tonal monochrome element of an image to be printed.

3. The method of claim 1 wherein said bit map has multiple bits per pixel.

4. The method of claim 1 further comprising sequentially creating bit maps for additional sides to be printed by repeating said defining, generating, receiving, assembling, and outputting steps for said additional sides.

5. The method of claim 4 wherein said printer has a printer speed at which it inputs said bit maps, wherein said outputting occurs at said printer speed, further comprising temporarily storing said bit maps after said assembling and prior to said outputting, and wherein said assembling occurs sufficiently fast to provide a backlog of said bit maps to permit said printer to maintain operation at said printer speed.

6. The method of claim 4 wherein said assembling includes writing image data of individual frames to addresses of randomly accessible buffers corresponding to locations at which the individual frames will appear on said printed side.

7. The method of claim 6 wherein said assembling includes reading stored image data stored in a said randomly accessible buffer, modifying said stored image data at a processor to obtain modified image data, and writing said modified image data to one of said randomly accessible buffers.

8. The method of claim 7 wherein said assembling includes combining image data of overlapping individual frames in a said composite frame at an imposition processor and writing the resulting combined values to said randomly accessible buffer.

9. The method of claim 5 wherein said assembling includes writing image data of individual frames to addresses of randomly accessible buffers corresponding to locations at which the individual frames will appear on said printed side, and wherein said temporarily storing is in said randomly accessible buffers.

10. The method of claim 1 wherein said individual frame parameters include size of a said individual frame and location of a said individual frame with respect to a respective said composite frame.

11. The method of claim 1 wherein said assembling includes scaling of said image data.

12. The method of claim 1 wherein said individual frame parameters include an orientation parameter specifying orientation of a said individual frame with respect to a respective said composite frame, and wherein said assembling includes rotating image data in a said individual frame as specified by a said control signal generated in response to a said orientation parameter.

13. The method of claim 1 wherein said individual frame parameters include a data type parameter specifying one of a plurality of different types of image data.

14. The method of claim 13 wherein a said composite frame includes individual frames having different data type parameters.

15. The method of claim 13 wherein said plurality of data types include bit map and compressed bit map.

16. The method of claim 15 wherein said plurality of data types further include ASCII string and numeric.

17. The method of claim 15 wherein said assembling includes converting a compressed bit map to an uncompressed bit map at a decompressor as specified by said control signal generated in response to a said data type parameter.

18. The method of claim 16 wherein said image data is in a form other than a bit map or compressed bit map, and further comprising converting said image data to a bit map or a compressed bit map prior to said receiving step.

19. The method of claim 1 wherein said individual frame parameters include an image combination characteristic specifying how to combine image data values for the same pixel location in a composite frame.

20. The method of claim 1 wherein said composite frame parameters further includ composite frame size and composite frame orientation.

21. The method of claim 1 further comprising defining said side in terms of sheet parameters including sheet size and sheet orientation.

22. Circuitry for processing image data to be sent as a print job to be printed on a printer comprising,

- a print job specifier that creates a job specification by defining a job as being constituted of one or more documents, defining each said document as being constituted of one or more sheets of paper, each sheet being of a specific size, defining each said sheet of paper as being constituted of one or two sides of paper, defining at least one composite frame for a side of a sheet to be printed and one or more individual frames to appear in each said composite frame, each said composite frame being defined by composite frame parameters that specify the display of said composite frame on said side of a sheet, each said individual frame being defined in terms of individual frame parameters that specify image data to be used in the individual frame and the display of said individual frame in said composite frame, each said composite frame being referenced in position with respect to said side to be printed in said composite frame parameters, each said individual frame being referenced in position with respect to its respective composite frame in said individual frame parameters,
- a printer controller that is run by printer controller software and is connected to receive said lob specification and said image data specified in said individual frames of said job specification, said printer controller positioning said composite frames of each said side as determined by said composite frame parameters and size of said sheet of paper and positioning each said individual frame within the respective said composite frame as determined by said individual frame parameters, said printer controller generating control signals to control interface circuitry and accessing said image data in response to said individual frame parameters and said composite frame parameters, and
- interface circuitry connected to receive said control signals and said image data for each said individual frame, said interface circuitry assembling a bit map for said side based upon said image data as specified by said control signals for all individual frames on said side and outputting said bit map from said interface circuitry to said printer.

* * * * *